United States Patent [19]

Sacco et al.

[11] Patent Number: 4,616,869
[45] Date of Patent: Oct. 14, 1986

[54] AERODYNAMIC FAIRING FOR PASSENGER CARS AND UTILITY-TYPE MOTOR VEHICLES

[75] Inventors: Bruno Sacco; Johann Tomforde, both of Sindelfingen; Joachim Paschke, Gechingen; Harald Leschke, Sindelfingen, all of Fed. Rep. of Germany

[73] Assignee: Daimler-Benz Aktiengesellschaft, Fed. Rep. of Germany

[21] Appl. No.: 561,231

[22] Filed: Dec. 14, 1983

[30] Foreign Application Priority Data

Dec. 17, 1982 [DE] Fed. Rep. of Germany ....... 3246767

[51] Int. Cl.⁴ .............................................. B62D 35/02
[52] U.S. Cl. .................................... 296/1 S; 296/209; 180/903
[58] Field of Search ...................... 296/1 S, 209, 31 P, 296/204, 203, 199; 280/154.5 R; 180/123, 126, 127, 903; 114/67 A; D12/190; 254/100, 108, 133 R

[56] References Cited

U.S. PATENT DOCUMENTS

| | | | |
|---|---|---|---|
| 3,029,042 | 4/1962 | Martin | 180/119 |
| 3,211,246 | 10/1965 | Lewis | 180/127 |
| 3,330,369 | 7/1967 | Hayward | 180/127 |
| 3,399,644 | 9/1968 | Hunt | 114/67 A |
| 3,463,264 | 8/1969 | Duthion | 180/127 |
| 3,561,558 | 2/1971 | Parkhouse | 180/123 |
| 3,662,854 | 5/1972 | Bertin | 180/126 |
| 4,122,909 | 10/1978 | Fair et al. | 180/127 |

FOREIGN PATENT DOCUMENTS

| | | | |
|---|---|---|---|
| 0037587 | 10/1981 | European Pat. Off. | 296/209 |
| 2641640 | 3/1978 | Fed. Rep. of Germany | 254/133 R |
| WO81/01538 | 6/1981 | PCT Int'l Appl. | 180/127 |
| 2071581 | 9/1981 | United Kingdom | 296/1 S |

Primary Examiner—Robert B. Reeves
Assistant Examiner—Dennis H. Pedder
Attorney, Agent, or Firm—Craig & Burns

[57] ABSTRACT

An aerodynamic fairing, made of a plastic material, for the outer laterally disposed longitudinally extending members, i.e., rocker panels, of bodies for passenger cars and utility-type motor vehicles, which, in conjunction with the outer wall of the longitudinal members, form a closed hollow body; in order to be able to extend a fairing of this type as far in the downward direction as is necessary for aerodynamic reasons, yet minimize the risk of damage to the fairing, the construction according to the present invention is such that the fairing comprises an upper zone, made of a plastic material which is comparatively dimensionally stable or form-rigid, and of a lower zone which can be elastically deformed and which is fastened to the upper zone in a preferably detachable manner, and in that the lower zone enables a reduction in its height in the event of contact with the ground by including predetermined flexing points or intentional bending places which facilitate such a height reduction.

18 Claims, 4 Drawing Figures

AERODYNAMIC FAIRING FOR PASSENGER CARS AND UTILITY-TYPE MOTOR VEHICLES

The present invention relates to an aerodynamic fairing, made of plastic material, for the outer laterally disposed longitudinally extending members, i.e., rocker panels, of bodies for passenger cars and utility-type motor vehicles which, in conjunction with the outer walls of the longitudinal members, form a closed hollow body.

Fairings generally of the above-mentioned type have been developed by companies for numerous types of vehicles, and are obtainable on the accessory market. These fairings are composed of dimensionally stable or form-rigid plastic parts and, from an aerodynamic point of view, either do not extend sufficiently far in the downward direction, or, alternatively, in extreme versions, are unsuitable for everyday service because contact with the ground can easily occur, for example, in the region of steep inclines, which may result in the fairing parts being damaged or destroyed.

Accordingly, the objects underlying the present invention include developing a fairing generally of the type described hereinabove in such a manner that it can be constructed optimally with respect to aerodynamic considerations, without being exposed as a result thereof to an increased risk of damage.

The underlying problems are solved according to the present invention by a fairing including an upper zone, made of a plastic material which is comparatively dimensionally stable or form-rigid, and a lower zone which can be deformed elastically and which is fastened to the upper zone in a manner preferably permitting detachment. The lower zone permits a reduction in its height in the event of contact with the ground by including predetermined flexing points or intentional bending places which facilitate such a height-reduction.

At the same time, it is advantageous if the upper zone is made of a plastic material which is capable of taking paint, such as, for example, GRP, and the lower zone is made of an unreinforced thermoplastic material or of polyurethane.

According to a further feature of the present invention, a particularly high deformation capacity, accompanied at the same time by good guidance of the airflow under the vehicle, is achieved by the lower zone having a wall which faces towards the middle of the vehicle, extends approximately vertically and constructed in the shape resembling an accordion.

In the interest of guiding the airflow in the optimum manner, it can also be advantageous if the lower zone forms a channel which is located on the inside and which opens in a generally downward direction.

These and other objects, features and advantages of the present invention will become more apparent from the following description when taken in connection with the accompanying drawing which shows, for purposes of illustration only, two embodiments in accordance with the present invention, and wherein.

Figure 1:
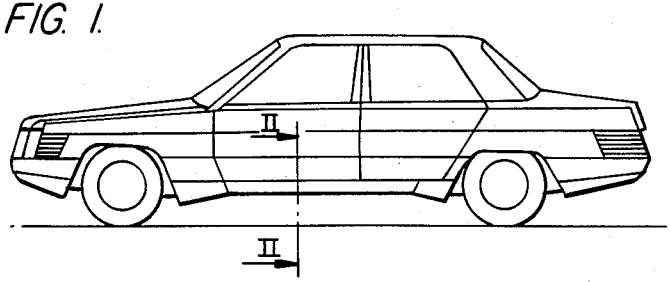
FIG. 1 is a side view of a passenger car which is equipped with rocker panel fairings according to the present invention.
Figure 2:
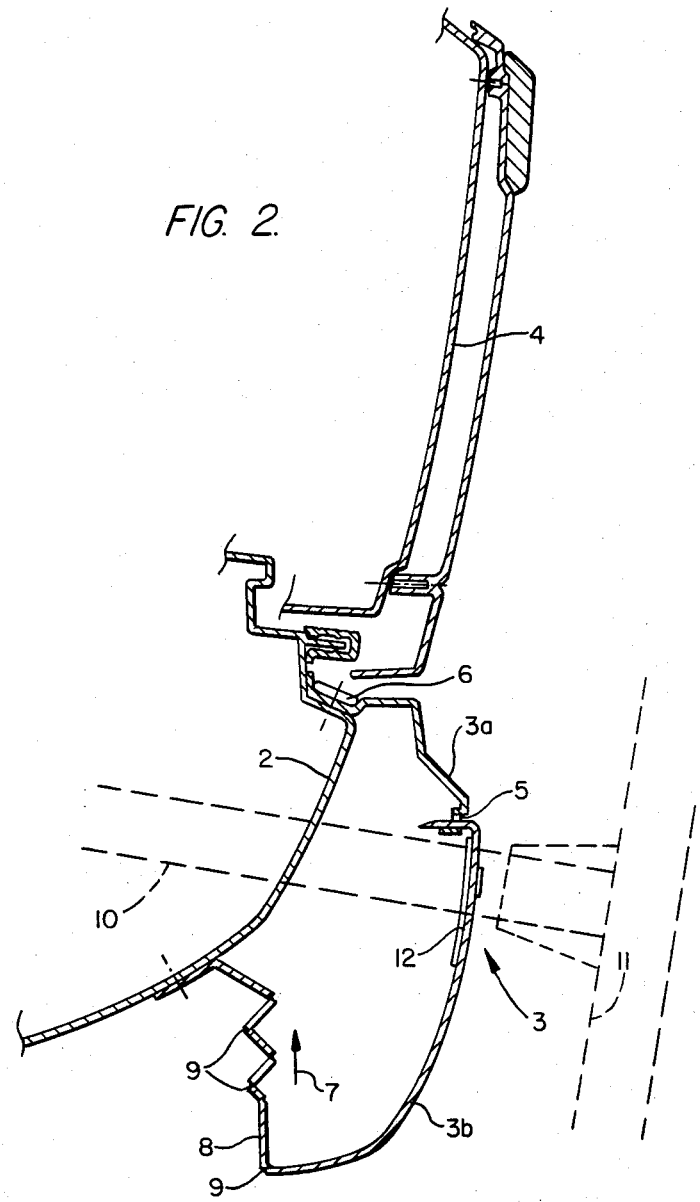
FIG. 2 is a cross-sectional view on a larger scale, along line II—II in FIG. 1.

Referring now to the drawing wherein like reference numerals are used throughout the various views to designate like parts, the passenger car 1, represented in FIG. 1 of the drawing, possesses, as shown in FIG. 2, a laterally disposed longitudinally extending member 2, conventionally referred to as a rocker panel, located beneath doors 4, which is partially covered by an aerodynamic fairing generally designated by reference numeral 3. This fairing 3 comprises a rigid upper zone $3a$, which can be manufactured, for example, from a glass-fiber reinforced plastic, and which can be painted the same color as the vehicle, and a lower zone $3b$, composed, for example, of a flexible thermoplastic or polyurethane, which is fastened at 5 to the upper zone $3a$ in any conventional manner, e.g., a clip connection permitting detachment (see clip at 5, FIG. 2 or 3) or by gluing (see glue surfaces 18, FIG. 4). The upper zone $3a$ is fastened to the longitudinal member 2, for example, by means of screws, with the interposition of a strip 6.

The capability of the lower zone $3b$ of the fairing 3 to yield is particularly enhanced in the direction of the arrow 7, by a rear wall 8, which extends approximately vertically, being constructed over a portion of its height like an accordion with predetermined flexing points or intentional bending places 9.

In order to permit the through-passage of the lifting lug or pin 10 of a vehicle jack 11, the lower zone $3b$ of the fairing 3 possesses a through-aperture (not shown) which is adapted to be closed automatically by means of a resilient cover 12, which is located on the inside of the lower zone $3b$ and is fastened along one side thereof.

Figure 3:
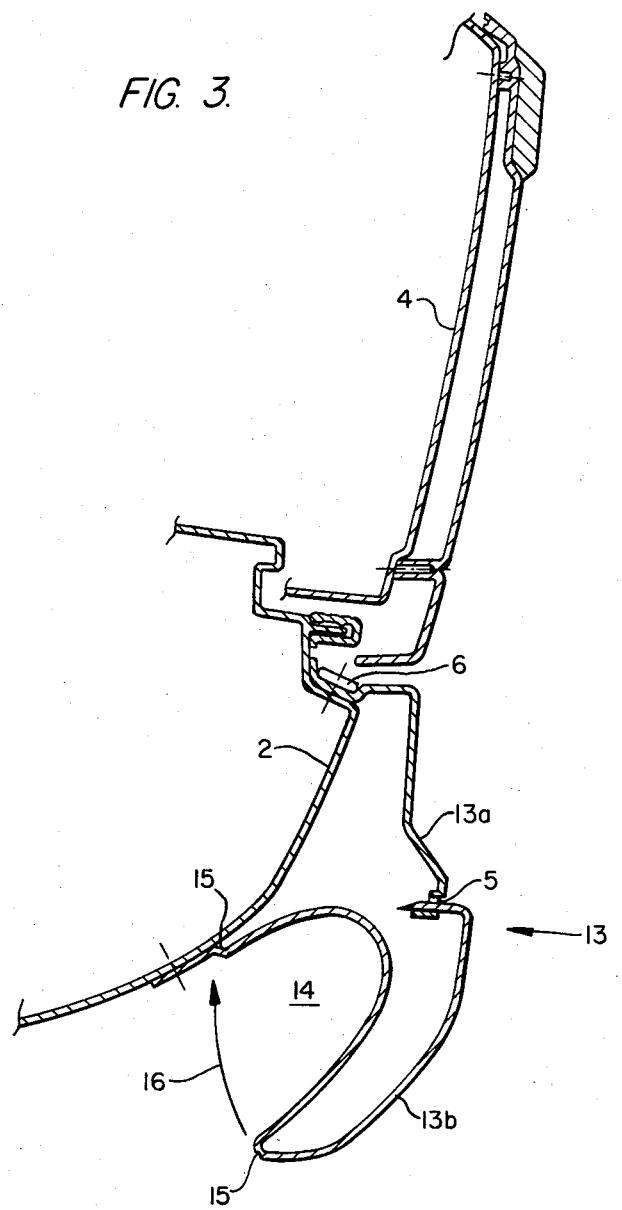
FIG. 3 is a cross-sectional view, corresponding to FIG. 2, through another embodiment of the present invention.
Figure 4:
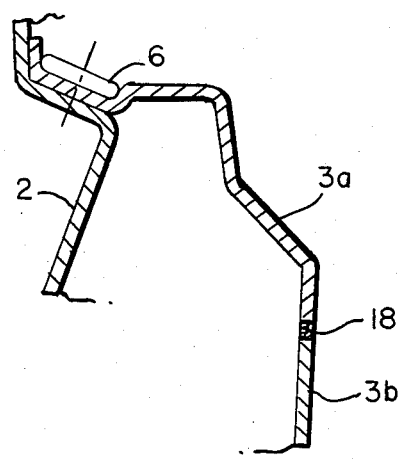
FIG. 4 is a partial cross-sectional view corresponding to FIGS. 2 and 3, showing another connection embodiment of the present invention.

In the illustrated embodiment according to FIG. 3 of the drawing, parts which are structurally identical to those in the illustrated embodiment described hereinabove, are designated by the same reference numerals. In this embodiment, however, the fairing 13 for the longitudinal member 2 is of a different construction. Although this fairing also includes an upper zone $13a$ and a lower zone $13b$, the latter, however, forms a channel 14, which is located on the inside, and which is delimited by predetermined flexing points or bending places 15. The channel 14 thereby serves for the optimum guidance of the lateral airflow under the vehicle, while the predetermined flexing points or intentional bending places 15 permit the lower zone $13b$ of the fairing 13 to yield easily in the direction of the arrow 16.

It would also be conceivable to obtain the greater yielding capacity in the lower zone, while retaining the same material as in the upper zone, by selecting a smaller wall thickness.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An aerodynamic fairing, made of plastic material, for outer laterally disposed longitudinally extending members of bodies for wheeled motor vehicles, which in conjunction with an outer wall of a respective outer member, forms a closed hollow body means, comprising an upper zone made of a plastic material which is comparatively form-rigid, and a lower zone having a lower portion depending below the outer wall which can be elastically deformed and an upper portion which is fastened to the upper zone, the closed hollow body being bounded by the outer wall and the upper and lower zones, and the lower zone including means for enabling a reduction in height of the fairing without the fairing being damaged.

2. A fairing according to claim 1, wherein said means for enabling a reduction in height includes a number of intentional bending places facilitating the height reduction.

3. A fairing according to claim 1, wherein the upper zone is made of a plastic material which is capable of taking paint.

4. A fairing according to claim 1, wherein the lower zone is made of one of an unreinforced thermoplastic material and polyurethane.

5. A fairing according to claim 1, wherein the lower zone includes a wall facing toward the middle of the vehicle, extending approximately vertically and constructed in a shape generally resembling an accordion.

6. A fairing according to claim 1, wherein the lower zone forms a channel which is located on the inside of the fairing and which is open in a generally downward direction.

7. A fairing according to claim 1, wherein at least one of the upper zone and the lower zone includes means for covering an aperture for the through-passage of a support pin of a vehicle jack.

8. A fairing according to claim 1, wherein the connection between the upper zone and the lower zone includes a clip-type connection means.

9. A fairing according to claim 1, wherein the connection between the upper zone and the lower zone is established by gluing.

10. A fairing according to claim 8, wherein the lower zone includes a wall facing towards the middle of the vehicle, extending approximately vertically and constructed in a shape resembling an accordion.

11. A fairing according to claim 8, wherein the lower zone forms a channel which is located on the inside of the fairing and which is open in a generally downward direction.

12. A fairing according to claim 9, wherein the lower zone includes a wall facing towards the middle of the vehicle, extending approximately vertically and constructed in a shape resembling an accordion.

13. A fairing according to claim 9, wherein the lower zone forms a channel which is located on the inside of the fairing and which is open in a generally downward direction.

14. A fairing according to claim 3, wherein the lower zone is made of one of an unreinforced thermoplastic material and polyurethane.

15. A fairing according to claim 14, wherein said means for enabling a reduction in height includes a number of intentional bending places facilitating the height reduction.

16. A fairing according to claim 15, wherein at least one of the upper zone and the lower zone includes means for covering an aperture for the through-passage of a support pin of a vehicle jack.

17. A fairing according to claim 16, wherein the connection between the upper zone and the lower zone includes a clip-type connection means.

18. A fairing according to claim 16, wherein the connection between the upper zone and the lower zone is established by gluing.

* * * * *